April 13, 1926.

G. EY

MOLD

Filed Sept. 17, 1925

1,581,043

WITNESSES
E. A. Wilson
Robert J. Hulsizer

INVENTOR
GUSTAV EY
BY
ATTORNEYS

Patented Apr. 13, 1926.

1,581,043

UNITED STATES PATENT OFFICE.

GUSTAV EY, OF NEW YORK, N. Y.

MOLD.

Application filed September 17, 1925. Serial No. 57,005.

*To all whom it may concern:*

Be it known that I, GUSTAV EY, a citizen of the United States, and a resident of the city of New York, borough of Manhattan, in the county of New York and State of New York, have invented a new and Improved Mold, of which the following is a full, clear, and exact description.

This invention related to a mold.

An object of the invention is to provide a mold element which can be associated readily with a plurality of similar elements to form a simple, efficient mold from which the molded articles can be quickly and easily removed.

A further object concerns the provision of a mold construction in which the mold elements can be readily assembled and held firmly in their relative position until the molded articles are to be removed.

Figure 1:
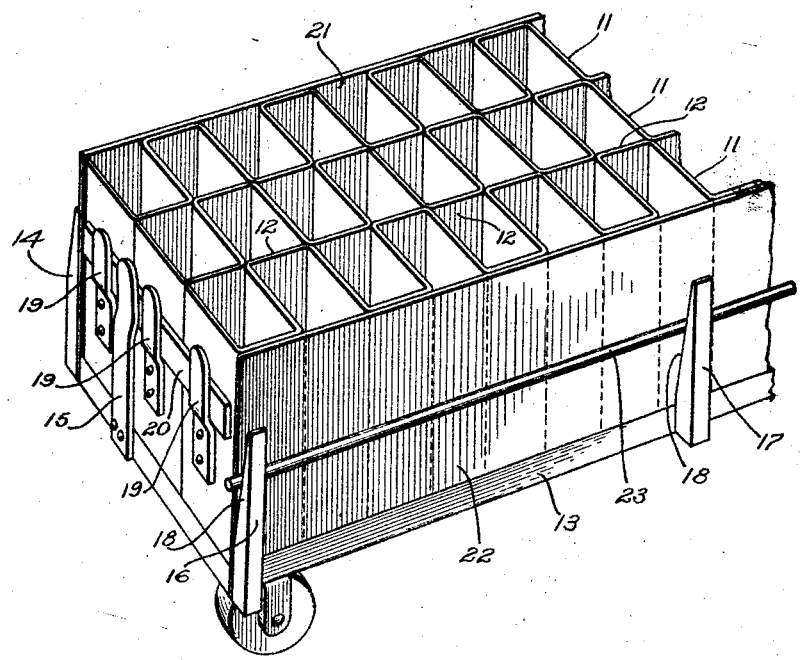
Figure 2:
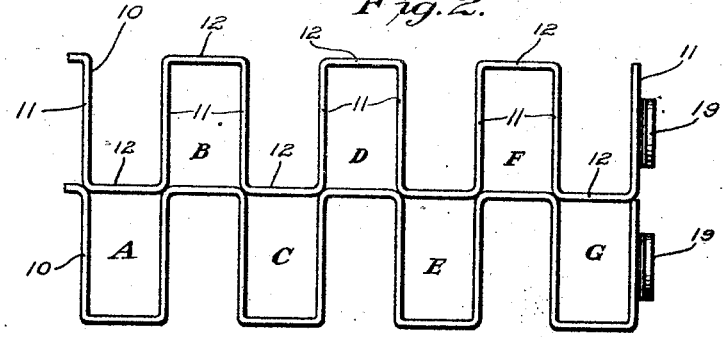

The invention is illustrated in the drawings of which Figure 1 is a perspective view of an assembled mold;

Figure 2 is a partial plan view of a pair of mold elements showing the manner in which they are related to form a plurality of cells in which the material to be molded is placed.

The form of the invention shown in the drawings is a preferred form, athough it is understood that modifications in the construction and arrangement of the parts and in the character of the materials used may be adopted without departing from the spirit of the invention as set forth in the appended claims.

In its general aspect the invention includes the provision of a mold element made of a sheet of preferably spring metal bent in a corrugated manner and adapted to be juxtaposed with respect their similar elements so as to form a plurality of cells into which the material to be cast or molded is placed.

The invention further includes a support for a number of mold elements on which they are firmly held in their proper relations during the time that the material is being molded.

By having the mold elements of spring metal it is especially a feature novelty that the mold elements can be stretched, or expanded to withdraw the walls of the mold element from the cast or molded material in order to permit of the ready ejection or removal of the material from the cells.

In the preferred form of the invention shown in the drawings I formed a mold of a plurality of mold elements each of which is formed from a sheet of preferably spring metal 10. Each sheet is bent in a corrugated manner and as shown in the drawing these corrugations assume a somewhat rectangular outline. The dimensions of the corrugations may be of any desired value and of course may have their cross-sectional shapes within rectangular. Each sheet has a plurality of transversely extending spaced walls 11 which are connected at alternately opposite ends by longitudinal walls 12.

By disposing one element in relation to another in a manner shown in Figure 2, a plurality of cells or chambers such as A, B, C, D, E, F and G are formed into which material may be introduced for the purpose of forming cast or molded articles such as blocks of cement, concrete, clay or similar materials.

In other words the successive mold element of corrugated form are placed adjacent each other with corresponding portions preferably aligned to form the cells above mentioned.

In Figure 1, I show a series of these mold elements mounted on a truck or platform 13 having bars such as 14, 15, 16 and 17 vertically disposed along its edges. The bars 16 and 17 along one side of the support have their inner faces tapered as shown at 18. The ends of each mold element are provided with spaced clamping plates 19 and clamping bars 20 are disposed as shown in Figure 1, between those plates and their respective mold elements. Removable side walls 21 and 22 are disposed along the edges of the series of mold elements as shown in Figure 1, and wedge bar 23 is forced down between the plate 22 and the tapered edges of the bars 16 and 17, thus causing the various elements forming the mold unit to be held tightly together. It will be observed that the curvature of each mold element is such that when the mold elements related as shown in Figure 2, the cells have particularly straight sides.

In the operation of the device, after the mold elements are formed into a compact unit, as shown in Figure 1, the material is introduced into the cells and allowed to set. After it is set the wedge bar or rod 23 is removed and then the set walls 21 and 22. The ends of the mold element are then engaged and stretched which, by reason of the fact that the elements are made of spring metal will cause the walls of the element to be sufficiently withdrawn or separated from the molded articles, as to readily permit the removal of the articles from the element.

What I claim is:

1. A mold which comprises a plurality of sheets of corrugated spring metal disposed adjacent each other to form cells.

2. A mold which comprises a plurality of sheets of corrugated spring metal disposed adjacent each other with corresponding portions aligned to form cells.

3. A mold which comprises a plurality of sheets of corrugated spring metal disposed adjacent each other with corresponding portions aligned to form cells, and means for holding said sheets in their related positions.

4. A mold element which comprises a corrugated sheet of spring metal, the successive chambers formed by the corrugation adapted to constitute portions of cells into which the material to be molded is introduced, the element as a whole adapted to be expanded longitudinally when the material is sufficiently hardened, in order to loosen the cells of the mold element from the material therewithin.

GUSTAV EY.